(12) United States Patent
Lewis

(10) Patent No.: US 7,699,169 B2
(45) Date of Patent: *Apr. 20, 2010

(54) WIPER BLADE PACKAGE

(75) Inventor: Gregg S. Lewis, Middleton, WI (US)

(73) Assignee: Portage Plastics Corporation, Portage, WI (US)

( * ) Notice: Subject to any disclaimer, the term of this patent is extended or adjusted under 35 U.S.C. 154(b) by 521 days.

This patent is subject to a terminal disclaimer.

(21) Appl. No.: 11/121,502

(22) Filed: May 3, 2005

(65) Prior Publication Data

US 2005/0252812 A1 Nov. 17, 2005

Related U.S. Application Data

(60) Provisional application No. 60/567,748, filed on May 3, 2004, provisional application No. 60/587,392, filed on Jul. 13, 2004.

(51) Int. Cl.
*B65D 73/00* (2006.01)
(52) U.S. Cl. .................................................. 206/471
(58) Field of Classification Search ................ 206/469, 206/470, 471, 467, 461, 443, 477, 480, 482, 206/483
See application file for complete search history.

(56) References Cited

U.S. PATENT DOCUMENTS

| | | | |
|---|---|---|---|
| 3,217,867 A | 11/1965 | Harris | |
| D235,080 S | 5/1975 | Verona | |
| 4,058,212 A | 11/1977 | Wyslotsky | |
| D271,000 S | 10/1983 | Rimer | |
| 4,512,474 A * | 4/1985 | Harding ....................... | 206/461 |
| 4,854,450 A | 8/1989 | Fisher | |
| 4,872,551 A | 10/1989 | Theros | |
| 4,899,877 A * | 2/1990 | Kiernan ....................... | 206/349 |
| 5,027,947 A * | 7/1991 | Reighart ...................... | 206/335 |
| 5,046,659 A | 9/1991 | Warburton | |
| 5,060,814 A | 10/1991 | Oglesbee | |
| 5,105,942 A | 4/1992 | van Veen et al. | |
| 5,129,516 A * | 7/1992 | Theros ........................ | 206/463 |
| 5,154,293 A | 10/1992 | Gould | |
| 5,156,267 A | 10/1992 | Yates, Jr. et al. | |
| 5,293,993 A * | 3/1994 | Yates et al. ................. | 206/365 |

(Continued)

FOREIGN PATENT DOCUMENTS

DE 2326093 12/1974

(Continued)

*Primary Examiner*—Jacob K Ackun, Jr.
(74) *Attorney, Agent, or Firm*—Boyle Fredrickson, S.C.

(57) ABSTRACT

An elongate article holding package for a wiper blade having a pair of package panels with at least one of the panels including a blade beam receiving seat and a support flat upon which part of the blade rests during packaging. When closed, the flats position and can clamp the blade therebetween. In a preferred embodiment, both panels are so configured and preferably include one or more longitudinal stiffeners that oppose bending moments created by force transmitted to the package by the blade beam. The package preferably is of tri-fold construction having a spine that is spaced from and protects the wiper element. The spine preferably includes at least a plurality of spaced apart longitudinally extending stiffeners. One or more stiffening flanges preferably are also provided. When closed, the panels and spine advantageously cooperate with each other to increase package crush and bending resistance.

21 Claims, 4 Drawing Sheets

U.S. PATENT DOCUMENTS

| | | | |
|---|---|---|---|
| 5,358,113 A * | 10/1994 | Hellenbrand | 206/411 |
| 5,358,134 A | 10/1994 | Ripley et al. | |
| 5,379,896 A | 1/1995 | Snow et al. | |
| D357,626 S | 4/1995 | Snow et al. | |
| D360,132 S | 7/1995 | Ripley | |
| 5,447,232 A * | 9/1995 | Chow | 206/378 |
| D368,027 S | 3/1996 | Baker | |
| D368,028 S | 3/1996 | Baker | |
| D368,029 S | 3/1996 | Baker | |
| 5,540,324 A | 7/1996 | Knapp | |
| 5,584,408 A | 12/1996 | Orkisz | |
| 5,865,307 A | 2/1999 | Friedman | |
| D406,755 S | 3/1999 | Garganese | |
| 5,899,334 A * | 5/1999 | Domerchie et al. | 206/470 |
| 6,041,933 A | 3/2000 | Baker | |
| 6,070,723 A | 6/2000 | Lewis | |
| D434,226 S | 11/2000 | Strohmeier | |
| 6,244,444 B1 | 6/2001 | Jacobus et al. | |
| 6,247,590 B1 | 6/2001 | Baker | |
| 6,625,955 B2 | 9/2003 | Aylward | |
| 6,675,433 B1 | 1/2004 | Stewart et al. | |
| 6,691,898 B2 * | 2/2004 | Hurray et al. | 222/190 |
| 6,766,906 B2 * | 7/2004 | Charng | 206/470 |
| 6,779,661 B1 | 8/2004 | Kotlarski | |
| 6,813,923 B2 | 11/2004 | Jones et al. | |
| 2003/0062284 A1 | 4/2003 | Charng | |
| 2004/0045858 A1 | 3/2004 | Harrold | |
| 2004/0131804 A1 | 7/2004 | Baker | |
| 2005/0082185 A1 * | 4/2005 | Lee | 206/335 |

FOREIGN PATENT DOCUMENTS

| | | |
|---|---|---|
| DE | 10224431 | 12/2003 |
| FR | 2843368 | 2/2004 |
| GB | 2190066 | 11/1987 |
| WO | WO 03/101796 | 12/2003 |
| WO | WO2005/026005 | 3/2005 |

* cited by examiner

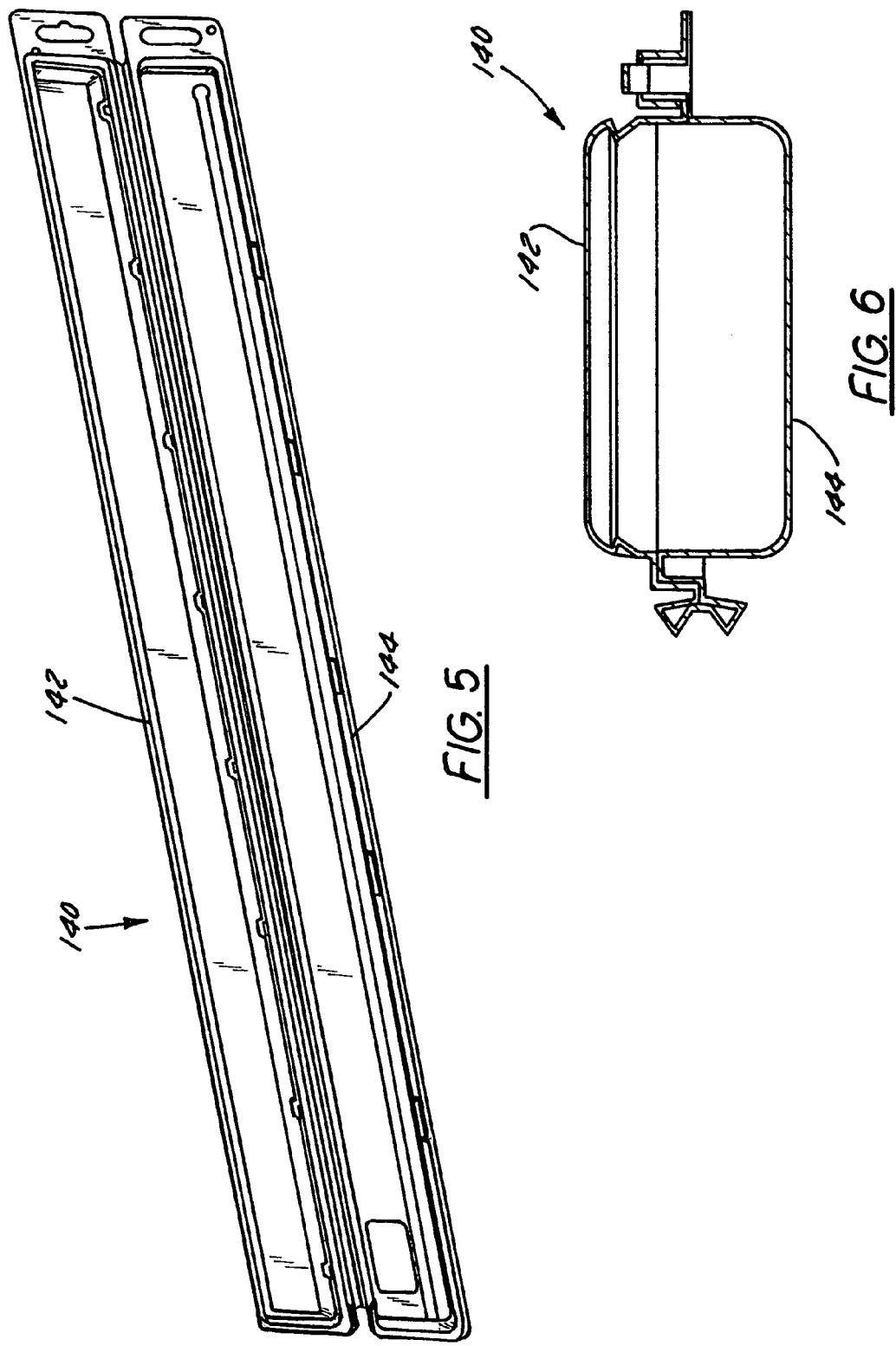

WIPER BLADE PACKAGE

CROSS-REFERENCE TO RELATED APPLICATION

This application claims all benefits from and priority to under 35 U.S.C. Section 119(e) to U.S Provisional Application Ser. No. 60/567,748, filed May 3, 2004, and to U.S Provisional Application Ser. No. 60/587,392, filed Jul. 13, 2004, the entirety of both of which are hereby expressly incorporated herein by reference.

FIELD OF THE INVENTION

The present invention relates to packaging and more particularly to wiper blade packaging that is particularly well suited for holding a beam-type vehicle wiper blade, particularly those of pre-curved beam construction.

BACKGROUND OF THE INVENTION

Beam-type windshield or windscreen wiper blades are growing in popularity throughout the United States and the world. Beam-type wiper blades have an elongate beam "backbone" that is curved along its length. They also have a rubber wiper element attached to one side of the beam and an adapter, used for releasably mounting the wiper blade to a vehicle, attached to the beam, extending outwardly from its other side. Examples of beam-type wiper blades are disclosed in U.S. Pat. Nos. 6,836,925, 6,813,923, and 6,550,096.

The curved beam helps ensure more constant and even pressure is applied along the entire windshield, providing a smoother, more consistent wipe. While conventional articulating framework wiper blades typically have somewhere around six or eight pressure points, beam-type wiper blades essentially have an infinite number of pressure points, helping to ensure the wiper element is urged against the windshield with substantially continuous pressure along substantially the entire length of the blade. A curved beam is also better able to conform to the curved contour of just about any vehicle windshield, which further ensures a smoother, more consistent wiping action.

During operation, each wiper blade is attached to an arm that moves back and forth across part of a windshield of a vehicle. The wiper element rides in concert along the surface of the windshield, essentially functioning as a squeegee to urge water in its path off the windshield.

Packaging such a beam-type windshield wiper blade poses unique challenges as compared to conventional wiper blades because of its curved beam. One challenge relates to the fact that beam-type wiper blades are significantly wider than conventional wiper blades. For example, where a conventional blade typically has a maximum transverse width no greater than three inches, a beam-type blade has a greater maximum transverse width that can be as wide as four or five inches.

Another challenge relates to protecting the wiper element. Due to the curvature of the beam and the arrangement of the wiper element, the end of the wiper element can become warped or distorted over time if the blade is not properly supported. This can cause that part of the wiper element to make poor contact with the windshield, which can cause undesirable streaking during wiper operation. This warpage or distortion can also extend along part of the squeegee edge of the wiper element, making these problems even worse. If too great, it can undesirably result in such warped or distorted wiper blades being returned to the store for refund.

Accordingly, it would be desirable and advantageous to provide packaging for a beam-type wiper blade that protects the blade while minimizing the volume it occupies.

SUMMARY OF THE INVENTION

The present invention is directed to a package for an elongate article that preferably is a wiper blade of pre-curved beam construction. The package has a plurality of package halves, at least one of which is configured with a blade seat that is capable of retaining the blade during packaging even so as to maintain the blade in a straighter configuration while doing so. The package preferably is of tri-fold construction having a spine hingably attaching the package halves.

The package halves can be substantially symmetrical, with the exception of on board latching structure and any outwardly extending flanges. Where asymmetrical, one of the package halves can differ, for example, by being equipped with a blade coupler or adapter recess.

Each package half preferably includes a seat that releasably receives one side or edge of a beam of a beam-type wiper blade. Each package half includes a support land, flat or abutment upon which part of the wiper blade rests during packaging such that it is engaged when the package is closed, such as to position or clamp the blade therebetween. In a preferred embodiment, part of the wiping element of the blade where it attaches to the beam rests upon the land, flat or abutment such that it is positioned or clamped between the package halves when they are closed.

The spine preferably is spaced from the tip or edge of the wiping element so as to protect it to prevent warping or otherwise deforming the wiping element. A hinge of preferably living construction joins the spine to each one of the package halves.

Each one of the package halves includes a plurality of integrally formed and longitudinally extending stiffening ribs that help strengthen and structurally rigidify the package when closed. Each one of the stiffening ribs preferably has an arcuate or curved sidewall cross section and has rounded ends where so equipped.

The spine also includes a plurality of pairs of stiffening ribs with one pair of the ribs being concave and curvilinear in cross sectional contour and another pair of the ribs outwardly projecting, having a generally Vee shaped cross section and defining therebetween a generally Vee shaped wiper element clearance recess.

When the package is closed, both edges or sides of the beam are received in a corresponding seat of each package halve helping to keep the wiper blade substantially straight in the package. Support flats of the package halves can bear against one another with any stiffening ribs formed in blade cradles of the opposed package halves overlying one another forming generally oval longitudinally extending stiffening tubes. In addition, a portion of each package half disposed along and adjacent the hinge can abut against an adjacent portion of the hinge with the end of the adjacent outwardly projecting rib of the spine being able to abut against part of the adjacent package half such that adjacent curved cross section ribs overlie one another forming elongate generally oval stiffening tubes. As a result of the package halves abutting these parts of the spine, resistance to crushing forces and bending moments is improved.

The package preferably is reclosable via a latching arrangement that preferably includes snaps that releasably engage snap receivers. The snaps and snap receivers are carried by upraised posts that preferably also serve as part of the blade seat of each corresponding package half. An outside edge or lip of the support flat of each cradle of the package halves also serve as part of each blade seat of each corresponding package half.

In a currently preferred embodiment, the package is a nest that is in turn received in another package that preferably also is of reclosable construction.

Objects, features and advantages of the present invention include providing a wiper blade package that is aesthetically attractive; that is of economical manufacture, that is durable, that is lightweight and low cost to ship, that is strong, that is easy to make and use, that is more versatile and adaptable, and which is durable, robust and reliable.

Numerous other aspects, features and advantages of the present invention will be made apparent from the following detailed description taken together with the drawing figures.

BRIEF DESCRIPTION OF THE DRAWINGS

The drawings illustrate the best mode currently contemplated of practicing the present invention. One or more preferred exemplary embodiments of the invention are illustrated in the accompanying drawings in which like reference numerals represent like parts throughout and in which:

FIG. 5 is a perspective view of a reclosable clamshell package in which the package of FIGS. 1-4 can be received; and FIG. 6 is cross section view of the clamshell package of FIG. 5 with the clamshell package shown closed.

Figure 1:
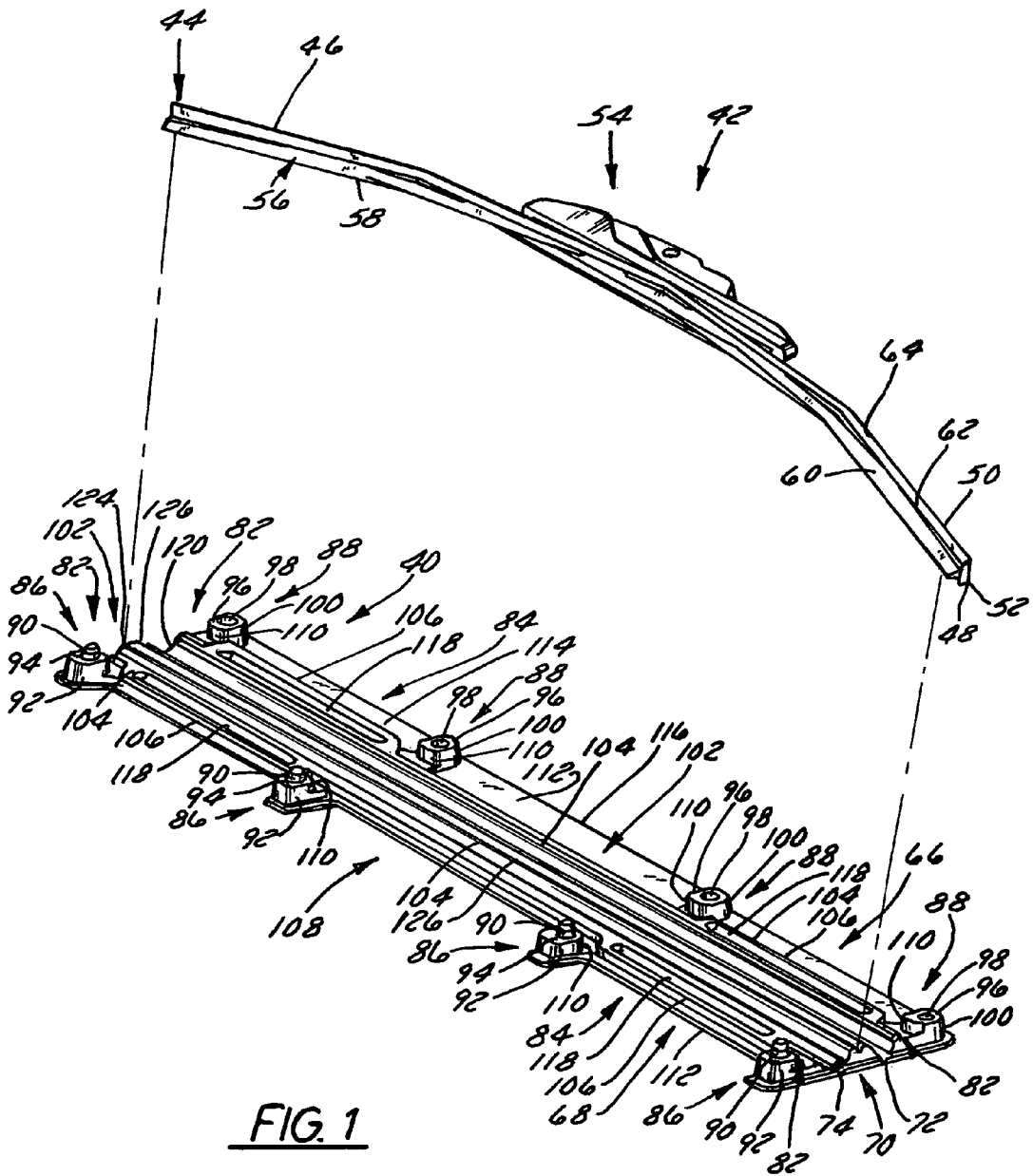
FIG. 1 is an exploded perspective view of a beam-type wiper blade and wiper blade package constructed in accordance with the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION OF AT LEAST ONE PREFERRED EMBODIMENT

FIG. 1 illustrates a preferred embodiment of a package 40 for a curved beam-type wiper blade 42 that is constructed and arranged to receive and releasably retain the blade 42. The package 40 is configured to retain the beam-type wiper blade 42 in at least a partially straightened condition while also protecting it. The package 40 preferably is constructed and arranged to be reclosable and to releasably retain the beam-type wiper blade 42 in a straightened condition without contacting any portion of its rubber-like wiper element 56.

The exemplary beam-type wiper blade 42 depicted in FIG. 1 has a beam 44, also referred to as a backbone, that is curved such that it has at least one radius of curvature. The beam 44 is generally rectangular in cross section and has a pair of outer surfaces 46, 48 and a pair of side edges 50 and 52. The beam 44 is formed or pre-formed so as to be curved, such as in the manner shown in FIG. 1. Typically, the beam 44 is made of steel, such as spring steel or the like.

A coupler 54 is attached to the beam 44 and is used to releasably attach the wiper blade 42 to a reciprocable wiper arm of a vehicle (not shown). The coupler 54 can include an adapter and can be configured to accept different types of adapters used to attach the blade 42 to different types of vehicles and wiper arm arrangements.

The blade 42 has a wiper element 56 made of an elastomeric material, such as rubber, and includes a wiping tip or edge 58 that makes contact with a windshield or windscreen of a vehicle to squeegee water off it during wiper operation. The wiping edge 58 is part of a generally triangularly shaped working segment 60 of the wiper element 56 that is attached by a relatively narrow hinge 62 (FIG. 4) to a wider strip 64, sometimes referred to as a spine, that is attached to one of the outer beam surfaces 48, such as by bonding or the like.

Figure 2:
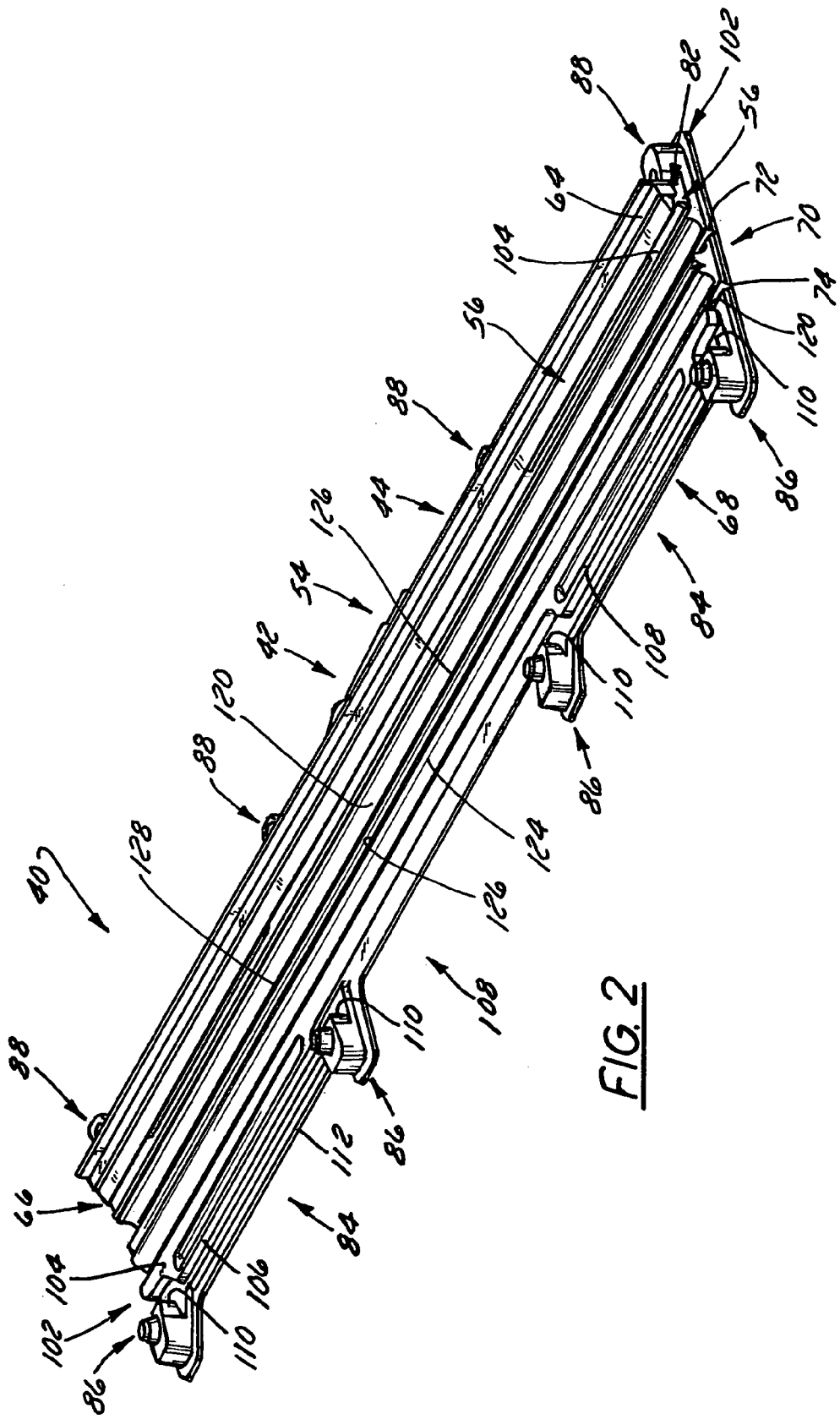
FIG. 2 is a perspective view of the package with the wiper blade seated in the package.
Figure 3:
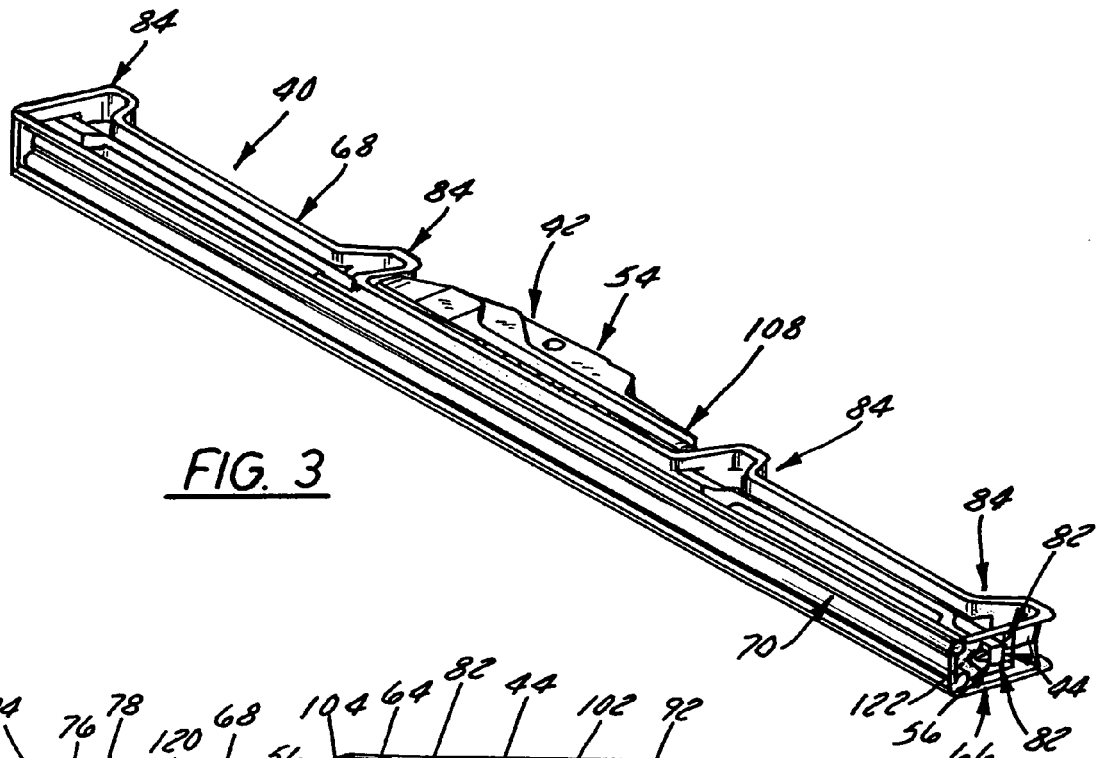
FIG. 3 is a perspective view of the package closed around the wiper blade.
Figure 4:
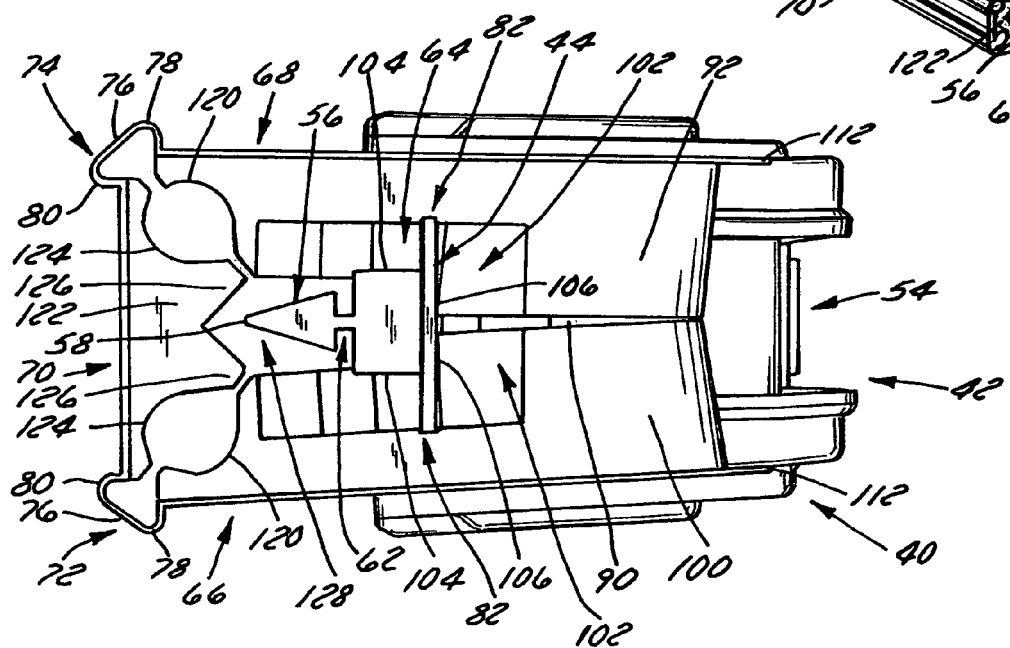
FIG. 4 is an end elevation view of the package closed around the wiper blade.

Referring additionally to FIGS. 2-4, the package 40 has a pair of package halves or panels 66 and 68, at least one panel 66 of which is three dimensionally contoured to accommodate at least a portion of a beam-type wiper blade 42. After placing the blade 42 in the contoured panel 66, such as in the manner depicted in FIG. 2, the other one of the package panels 68 is folded over the blade 42 and engaged with package panel 66 to close the package 40. As is shown in FIGS. 3 and 4, when closed, the package 40 shields and protects the wiper element 56, preferably along substantially its entire length, preventing it from becoming deformed, warped or otherwise permanently distorted while packaged. As a result, a package 40 constructed in accordance with the present invention is able to protect the wiper element 56 during shipment, warehousing, retail display and all the way up until when an end user removes the blade 42 and puts it on their vehicle.

Engagement between the panels 66 and 68 preferably is releasable to permit the package 40 to be opened to remove the blade 42 and can be re-closed should it be desired to put the blade 42 back in the package 40. Where the package 40 is displayed in a retail setting, being reclosable advantageously enables customer returns to be put back in the same package 40 (or a different package 40) and then put back on the display without it being apparent that the blade 42 had ever been returned.

The package 40 preferably includes a spine 70 located between the panels 66 and 68. The spine 70 extends substantially the length of the package 40 and overlies at least part of the wiper element 56 when the package 40 is closed. As is shown in FIG. 4, the spine 70 overlies the wiping edge 58 of the wiper element 56 when the package 40 is closed but is spaced from the wiping edge 58 so as not to come into contact with it.

The spine 70 is attached to each package panel 66 and 68 by a corresponding hinge 72 and 74 that preferably is a living hinge or the like. As is shown in FIGS. 1-4, the spine 70 is attached to panel 66 by one hinge 72 and is attached to panel 68 by another hinge 74. Each hinge 72 and 74 extends along a corresponding lengthwise extending side of the spine 70 and preferably extends substantially its entire length.

As is shown more clearly in FIG. 4, the preferred embodiment of each hinge 72 and 74 is C-shaped in cross section and has a flat hinge segment 76 located between a pair of spaced apart and curved hinge segments 78 and 80 that each respectively is connected to one of the package panels 66 and 68 and the spine 70. This preferred hinge arrangement is advantageous because it facilitates relative alignment and location of the package panels 66 and 68 and spine 70 during package closing, such as during automated wiper blade packaging, as well as when the package 40 is closed to keep everything properly spaced and oriented relative one another and a wiper blade 42 received in the package 40. Such a C-shaped hinge configuration preferably also helps make the package 40 stiffer and better able to resist the bending moment that a beam-style wiper blade 42 causes due to its desire to want to return to its curved shaped when in the package 40 and the package 40 is closed.

Both package panels 66 and 68 can be three dimensionally contoured, such as in the manner shown in FIGS. 1-2. At least one and preferably both of the package panels 66 and 68 include a seat 82 in which at least part of the beam 44 of the wiper blade 42 is retained. The seat 82 preferably is constructed to retain the beam 44 in at least a partially straightened condition, opposing its tendency to want to bend back to its original curved shape.

In the preferred package embodiment shown in FIGS. 1-4, the straightened blade beam retainer seat 82 is configured to retain the beam 44 of a beam-type wiper blade 42 in a substantially straightened condition, thereby minimizing the transverse width of the beam-type wiper blade 42 when packaged. The seat 82 preferably is configured to keep the beam 44 substantially straight when seated by supporting the beam 44 along at least a plurality of pairs of spaced apart locations, i.e. at least three spaced apart locations, along both outer surfaces 46 and 48 of the beam 44 along a substantial portion of the length of the beam 44.

While such support locations can overlie one another or be in line with one another, support locations located on one side of a seated beam 44 preferably are staggered relative to support locations located on the other side of the beam 44 as depicted in the preferred package embodiment shown in FIGS. 1-4. For example, in this preferred embodiment, support to keep straight and retain the beam 44 in the seat 82 preferably is provided along part of both sides or surfaces 46 and 48 of the beam 44 adjacent each end of the wiper blade 42 with such support preferably extending to adjacent a corresponding side of the wiper blade coupler 54. Such staggered support advantageously integrates with the package panels 66 and 68 releasable engagement arrangement thereby minimizing the size of the package 40.

One and preferably both package panels 66 and 68 include a blade cradle 102 that works in concert with the seat 82 to stably hold at least part of the beam blade 42 during packaging to facilitate ease of packaging and preferably also when the package 40 is closed. For example, FIG. 2 illustrates a beam-style wiper blade 42 received in a blade cradle 102 of three dimensionally contoured construction formed in package panel 66 with its beam 44 disposed in the seat 82, readying the package 40 to be closed around the wiper blade 42. In the preferred embodiment shown in FIGS. 1-4, the blade cradle 102 includes a flat 104 upon which at least part of one side of the wiper element strip or spine 64 rests when the beam 44 of the blade 42 is received in the adjacent seat 82. During packaging, it makes it easier for an operator or machine to ensure uniform insertion of the beam 44 into the seat 82 by first inserting the beam 44 into the seat 82 until one side of the wiper element strip or spine 64 abuts against the flat 104 of the cradle 102.

When the package 40 is closed around the wiper blade 42, the flat 104 of the cradle 102 also helps support the blade 42 and maintain it at a desired position within the package 40 by serving as a stop or locator against which the wiper element strip or spine 64 contacts or can contact. Where both package panels 66 and 68 are so equipped, the flat 104 of each cradle 102 of each panel 66 and 68 preferably also can clamp or abut against both sides of the wiper element strip or spine 64, helping to support it in the package 40. This clamping or locating function also advantageously helps to properly position the wiper blade 42 within the package 40 so as to ensure the package 40 does not come into contact with the wiping edge 58 and preferably also the working segment 60 of the wiper element 56.

By retaining a beam-style wiper blade 42 in a straightened condition, package size is advantageously minimized. By configuring the package 40 so it provides beam straightening support to the beam 44 of a blade received in the package 40 in such an integrated fashion, package size is further minimized. This produces a package 40 well suited for retail display applications, such as where several packages 40 are put in a box (not shown) that can also double as a retail display. Such a package 40 is also well suited for retail display on a shelf or by being hung on peg board or the like in a store.

By minimizing the maximum transverse width of a beam-style blade 42 by keeping it substantially straight when packaged, a package 40 constructed in accordance with the present invention can be hung in rows on retail display pegboard with adjacent rows being spaced apart no greater than or about the same distance as for packaging used for conventional wiper blades. In addition, minimizing the packaged width of beam-style blades using packaging made in accordance with a package 40 of the present invention advantageously takes less volume than if the beam 44 were not straightened (or even straightened to a lesser degree than substantially straight as with the preferred embodiment), which advantageously reduces shipping and storage costs.

As a result, a package 40 constructed in accordance with the present invention releasably and reclosably holds a pre-curved beam-style wiper blade 42 in a substantially straightened condition having a length that is a plurality of pairs times its width at its widest section and having a width at its widest section that is a plurality of times its thickness or depth. For example, a package 40 constructed in accordance can hold a pre-curved beam style wiper blade 42 ranging in length anywhere between ten inches and thirty inches, has a package width no greater than three inches, and preferably two inches or less, and has a package depth or thickness no greater than one inch. Such a package 40 can have such compact dimensions despite being made of a relatively thin synthetic, polymeric or plastic mater. For example, a preferred embodiment of the package 40 is formed of polyethylene terepthalate (PET or PETE) having a wall thickness that can vary between eight mils and twenty mils but preferably ranges between ten mils and fifteen mils. If desired, another suitable material, such as polyvinyl chloride (PVC) can be used. Being able to retain the packaged beam-style wiper blade 42 in a substantially straightened condition advantageously enables these desirably compact packaging dimensions to be achieved, even when making the package 40 out of such thin material.

Where made of PET or PVC, the package 40 preferably is thermoformed of a single sheet preferably using, for example, a high speed inline pressure forming process or the like. The package 40 preferably is transparent but can be made opaque so as to be colored if desired. If desired, the package 40 can include indicia (not shown) molded or otherwise formed in it. Such indicia can also be imprinted on the package 40, if desired. The package 40 can also be configured to accommodate a card (not shown), such as a display card overlying the spine 70, such as in between the hinges 72 and 74, and/or overlying one or both package panels 66 and 68.

The package 40 preferably is of tri-fold construction and is configurable as a clamshell, where desired. While the package 40 can be configured as a stand-alone package, the preferred embodiment of the package 40 depicted in FIGS. 1-4 is configured as a package nest.

Where configured as a package nest, the package 40 preferably is received in another package that can be a sleeve, a carton, a tube, or another package that also can be of reclosable construction. For example, in one preferred embodiment, a package 40 constructed in accordance with the present invention is a nest that is received in an outer package that preferably is of reclosable construction. An example of one preferred outer package that is of reclosable construction is the reclosable clamshell package 140 shown in FIGS. 5 and 6. The clamshell package 140 has a reclosable lid 142 that releasably engages a bottom 144 when closed. Such a package 140 can be constructed in accordance with the package disclosed in commonly owned U.S. Pat. No. 5,899,334, the disclosure of which is expressly incorporated herein by reference. If desired, once loaded with a wiper blade 42, package 40 is then loaded into clamshell package 140 and the clamshell package 140 is thereafter closed around the package 40.

A package 40 constructed in accordance with the present invention includes at least one latching arrangement 84 that preferably is of integral construction for enabling the package 40 to be closed. The latching arrangement 84 preferably is of releasable construction to enable the package 40 to be opened and re-closed, such as where it is desired to put a beam-style wiper blade 42 back in the package 40 and return it.

In the preferred embodiment shown in FIGS. 1-4, the package 40 has a plurality of spaced apart releasable latching arrangements 84 with one of the latching arrangements 84 being located on one side of a coupler 54 of a wiper blade 42 received in the package 40 and the other one of the latching arrangements 84 being located on the other side of the wiper blade coupler 54.

Each latching arrangement 84 includes at least one latch that includes a portion of one package panel 66 that engages a portion of the other package panel 68. For example, in the preferred embodiment shown in FIGS. 1-4, each latch assembly 84 includes a plurality of latches that each includes an outwardly projecting snap 86 integrally formed in one of the package panels, such as preferably panel 68, that is received in a complementary snap receiver 88 integrally formed in the other one of the package panels, such as preferably panel 66. While all of the snaps 86 are disposed on one panel, in this case panel 68, and all of the snap receivers 88 are disposed on the other panel, in this case panel 66, it should be recognized that their locations can be reversed or otherwise changed from that shown in FIGS. 1-4 such that a single package panel can have one or more snaps and snap receivers located on it.

Each snap 86 preferably includes a boss 90 that protrudes outwardly from an upraised post 92 that has a shoulder 94 encircling it that abuts against a shoulder 96 encircling a recessed pocket 98 formed in an upraised pedestal 100 of the snap receiver 88 when the boss 90 of the snap 86 is received in the pocket 98 of the snap receiver 88. A suitable fit, such as a tight fit, an interference fit, or the like, is provided between the snap 86 and snap receiver 88 to prevent unintended disengagement. For example, the outer diameter of the boss 90 preferably is the same as or slightly larger than the inner diameter of the pocket 98 which receives the boss 90 to provide a tight frictional engagement therebetween.

Each beam receiving seat 82 preferably is defined on one side by part of the latching arrangement 84, which is disposed outside of a seated wiper blade beam 44 and is defined on the other side by at least part of an upraised guide wall 106 formed by part of each adjacent cradle flat 104 located opposite a coupler accommodating clearance 108 of the package 40, which is disposed inside of the seated beam 44. In the preferred embodiment depicted in FIGS. 1-4, where the beam 44 is received in the seat 82 in package panel 66, the part of the latching arrangement 84 that forms the outside portion of the seat 82 is the pedestal 100 of each snap receiver 88. Where the beam 44 is received in the seat 82 in package panel 68, the part of the latching arrangement 84 that forms the outside of the seat 82 is the post 92 of each snap 86. To help provide a seat 82 that is elongate and substantially straight to help ensure the seated beam 44 seats substantially straight in the seat 82, each guide wall 106 is substantially planar and generally parallel to an interiorly facing flat abutment 110 formed in each corresponding post 92 and pedestal 100 of the seat 82.

Depending on the magnitude of the bending moment imparted by the wiper blade 42 wanting to return its normal curved shape when received in the package 40, the package 40 preferably is constructed with one or more stiffening and/or structurally rigidifying features formed in it that help it to oppose the moment without deflecting or at least deflecting within acceptable limits or tolerances.

For example, in the preferred embodiment shown in FIGS. 1-4, the package 40 preferably has a stiffening flange 112 that lies along a common plane when the package 40 is empty with the flange 112 preferably extending outwardly at least one-eight of an inch from the rest of the package 40 substantially or completely about the entire periphery of the package 40. Where additional stiffness and structural rigidity is needed, part of the stiffening flange 112 preferably includes a widened section 114 so as to extend along a straight line running parallel to the central longitudinal axis of the package 40 such that its outer edge 116 is substantially straight and located outwardly of or outboard both latching arrangements 84 of at least one of the package panels 66 and 68. For example, with reference to FIG. 1, such a wider stiffening flange 114 extends from one end of the package 40 to the other end of the package 40 and underlies the coupler accommodating recess 108 of the package 40. Such a stiffening flange 112, including when configured with a wider stiffening flange or flange section 114, extends generally perpendicular to and therefore directly opposes one or more bending moments induced in the package 40 created by force transmitted to it due to the tendency of the wiper blade 42 wanting to return to or spring back to its normally curved shape.

If desired, the wider flange or flange section 114 can be contoured so as to facilitate packaging of additional materials, including blade wiping pads, adapters and the like. If desired, cutouts in the flange or flange section 114 can be provided for such other materials.

To impart additional stiffness to the package 40, the flat 104 of each cradle 102 preferably has a longitudinally extending stiffening rib 118 formed in it. Each such stiffening rib 118 is elongate and has a length less than that of the cradle 102 in which it is formed. If desired, the cradle 102 on one or both package panels 66 and 68 can extend substantially the length of the package 40 instead of terminating on one side or the other side of the coupler accommodating recess 108 with the resultant stiffening rib having a length longer than that shown in FIGS. 1-4. For example, where such a cradle is of extended length and equipped with an integrally formed stiffening rib, the rib can extend substantially the length of the cradle, if desired.

To increase and help maximize package stiffness while producing a package 40 that is readily formable by thermoforming, each rib 118 is of curved or arcuate cross sectional contour such that it is of concave construction as it is recessed into the flat 104 of each cradle 102 equipped with such a rib 118. Each end of each such stiffening rib 118 preferably is rounded, thereby advantageously providing improved package stiffness while simultaneously minimizing formation of stress risers along the rib 118. When the package 40 is closed, ribs 118 of one package panel 66 overlie the other package panel 68 forming an oblong torsion resistant tube or tubular structure (not shown) helping increase stiffness and torsional rigidity.

Each package panel 66 and 68 preferably also includes an elongate stiffening rib 120 that extends along a corresponding adjacent hinge. Each rib 120 preferably extends substantially the length of the package 40 and also has a curved or arcuate cross sectional contour.

The spine 70 of the package 40 is also three dimensionally contoured to increase package stiffness and improve structural rigidity. As is shown more clearly in FIG. 4, the spine 70 has a pair of spaced apart end walls 122, only one of which is shown in FIG. 4, between which extend a pair of recessed stiffening ribs 124 having a curved or arcuate cross sectional contour same as or complementary to the curved or arcuate stiffening ribs 120 formed in one and preferably both package panels 66 and 68.

In addition, the spine 70 has a second pair of stiffening ribs 126 that both project outwardly and are disposed at an acute angle relative to one another so as to form a generally Vee shaped wiping element edge clearance recess 128 between the wiping element of a wiper blade 42 received in the package 40 and the spine 70. Each outwardly projecting stiffening rib 126 preferably has a generally Vee shaped cross sectional contour. These ribs 126 along with the clearance recess 128 between the spine 70 and the wiping element edge 58 preferably extend substantially the length of the package 40. As a result of the spine 70 extending substantially the length of the package 40, it overlies substantially the entire wiping element edge 58, advantageously providing protection to substantially the entire wiper element 56.

Referring to FIG. 4, when the package 40 is closed, part of the support flat 104 of each cradle 102 abuts against part of the tip or end 130 of a corresponding outwardly projecting stiffening rib 126 of the spine 70 creating a generally oval stiffening tube structure 132 that extends at least substantially the length of the corresponding cradle and that preferably extends substantially the length of the package 40. Part of the spine extending adjacent a corresponding hinge also can abut against part of the adjacent package panel that also extends adjacent that same hinge, such as in the manner shown in FIG. 4. The ability of these surfaces to bear or abut against one another when the package 40 is closed also advantageously improves the ability of the package 40 to withstand the application of crushing and bending loads making the package 40 stronger.

A package 40 constructed in accordance with the present invention is easy to close, as each snap 86 is easily pressed into engagement with its corresponding snap receiver 88 when closing the package 40. The package 40 is just as easy to open as one as preferably both package panels 66 and 68 are grasped and pulled apart to disengage each snap 86 from its snap receiver 88.

In assembly, a beam-style wiper blade 42 is manipulated to straighten it and so as to insert one side edge of its beam 44 into the seat 82 in one of the package panels 66 or 68. Thereafter, the other one of the package panels 68 or 66 is folded over and brought toward the wiper blade 42 until the other side edge of the beam 44 is received in the seat 82 of the other one of the package panels 68 or 66. Thereafter, the package panel is moved closer to the other package panel until each one of the snaps 86 begin to seat in a corresponding snap receiver 88. To the extent needed, additional force is applied to one or both package panels 66 and 68, including in the vicinity of one or more of the snaps 86 and/or snap receivers 88, until each one of the snaps 86 releasably but positively engages its corresponding snap receiver 88.

It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A wiper blade package for a beam-type wiper blade comprising:
    a plurality of elongate package panels, at least one of which is three dimensionally contoured along a longitudinal extent to substantially conform to at least a portion of an elongate pre-curved beam-type wiper blade;
    wherein one of the package panels releasably engages the other one of the package panels releasably retaining the beam-type wiper blade therebetween;
    wherein longitudinally extending side edges of a beam of the beam-type wiper blade are retained captive between the package panels by engagement between the beam and the package panels when the package panels are releasably engaged in a closed position without the package panels contacting a hinged wiping edge of a wiping element of the beam-type wiper blade; and
    wherein the package panels are constructed and arranged to engage the beam-type wiper blade in a manner that retains the beam-type wiper blade in a substantially straight condition when the package panels are releasably engaged in the closed position.

2. The wiper blade package of claim 1 wherein one of the package panels has a snap and the other one of the panels has a snap receiver that releasably receives the snap of the one of the package panels to releasably engage the package panels.

3. The wiper blade package of claim 2 wherein the wiper blade package further comprises a spine connected by a first hinge to one of the package panels and connected by a second hinge to the other one of the package panels forming a wiper blade package of tri-fold construction.

4. The wiper blade package of claim 3 wherein a portion of each one of the package panels and the spine define a protective chamber encompassing the hinged wiping edge of the wiping element of the beam-type wiper blade when the package panels are releasably engaged without any part of the hinged wiping edge contacting any part of the protective chamber.

5. A wiper blade package comprising:
    (a) a pair of package halves that each has (i) a recessed wiper blade cradle formed to receive a portion of a wiper element of a beam-type wiper blade therein and (ii) at least one wiper blade beam seat extending alongside the wiper blade cradle that is comprised of a pair of opposed upraised abutments between which an elongate beam of the beam-type wiper blade is releasably received;
    (b) a package spine comprised of a hinge arrangement interconnecting the package halves enabling one of the package halves to be moved relative to the other one of the package halves between an open position and a closed position defining a wiper blade package of tri-fold construction having a clearance recess between the package spine and the package halves in which a working segment that includes a wiping edge of an elastomeric wiper element of the beam-type wiper blade is disposed;

(c) wherein one of the package halves releasably engages the other one of the package halves at a plurality of spaced apart releasable latching arrangements when disposed in the closed position releasably retaining the beam-type wiper blade between the closed package halves.

6. The wiper blade package of claim 5, wherein each latching arrangement comprises a snap that has a snap boss integrally formed in one of the package halves and a snap boss receiving pocket integrally formed in the other one of the package halves.

7. The wiper blade package of claim 5, wherein the hinge arrangement comprises a first living hinge that connects the package spine to one of the package halves and a second living hinge that connects the spine to the other one of the package halves.

8. The wiper blade package arrangement of claim 7, wherein the portion of the wiper element received in the wiper blade receiving cradle formed in each package half comprises a strip or spine of the wiper element and wherein the wiper element strip or spine is clamped between the cradles of the package halves when the package halves are releasably engaged in the closed position.

9. The wiper blade package of claim 5, wherein each package half comprises a plurality of wiper blade beam seats spaced apart in a longitudinal direction alongside the wiper blade cradle, with one abutment of each wiper blade beam seat comprising an integrally formed lip and the other abutment formed by a portion of the latching arrangement.

10. The wiper blade package of claim 9, wherein the wiper blade cradle and wiper blade beam seat formed in one of the package halves is aligned with and overlies the wiper blade cradle and wiper blade beam seat formed in the other one of the package halves when the package halves are disposed in the closed position.

11. The wiper blade package of claim 10, wherein the plurality of releasable latching arrangements each comprise a snap integrally formed in one of the package halves that releasably engages a snap receiver integrally formed in the other one of the package halves, wherein each wiper blade beam seat further comprises a land disposed between the lip and the one of the snap and snap receiver.

12. The wiper blade package of claim 9, wherein the wiper blade cradles of both package halves clamp a wiper blade received in one of the wiper blade cradles when the package halves engage one another in a closed position defining a recess in which a wiping tip of a wiper blade working element is disposed without contacting any part of either one of the package halves.

13. The wiper blade package of claim 7, wherein the end piece has a pair of elongate stiffening ribs formed therein that each oppose an elongate stiffening rib formed in an adjacent one of the package halves when the package halves are disposed in the closed position.

14. A wiper blade package in combination with a beam-type wiper blade comprising:
(a) the beam-type wiper blade comprising an elongate curved beam, an elongate wiping element that includes a spine attached to the beam and a working segment with a wiping tip extending outwardly therefrom;
(b) the wiper blade package comprising a pair of package halves attached by a hinge arrangement and movable between an open position where it accepts the beam-type wiper blade and a closed position where the beam-type wiper blade is retained therebetween, wherein the package halves are constructed and arranged to engage the beam of the beam-type wiper blade in a manner that retains the beam-type wiper blade in a substantially straight condition without any part of the package contacting the wiping tip of the wiping element.

15. The wiper blade package and beam-type wiper blade combination of claim 14 wherein the wiper blade package further comprises a releasable latching arrangement that enables the package halves to be releasably retained in the closed position.

16. The wiper blade package and beam-type wiper blade combination of claim 14 wherein the hinge arrangement comprises a spine with a first hinge that attaches to one of the package halves and a second hinge that attached to the other one of the package halves wherein the spine and package halves define a recess in which at least the wiping tip of the wiping element of the beam-type wiper blade is disposed.

17. The wiper blade package and beam-type wiper blade combination of claim 16 wherein the first and second hinges each form a stiffening rib when the package halves are disposed in the closed position.

18. The wiper blade package and beam-type wiper blade combination of claim 16 wherein the spine abuts against each one of the packaging halves when the packaging halves are disposed in the closed position and wherein the spine comprises a pair of recessed stiffening ribs formed therein that each oppose a recessed stiffening rib formed in an adjacent one of the package halves when the package halves are disposed in the closed position.

19. A wiper blade package in combination with a beam-type wiper blade comprising:
(a) the beam-type wiper blade comprising an elongate curved beam, an elongate wiping element that includes a spine attached to the beam and a working segment with a wiping tip extending outwardly therefrom;
(b) the wiper blade package comprising (1) a pair of elongate reclosable package halves with each one of the package halves comprising an elongate blade cradle formed therein in which part of the beam-type wiper blade is received, and a beam seat formed therein in which the beam of the beam-type wiper blade is received, (2) an elongate spine comprising a first hinge attaching the spine to one of the package halves and a second hinge attaching the spine to the other one of the package halves, and (3) wherein one of the package halves is closeable over the other one of the package halves with a portion of the beam-type wiper blade disposed in the blade cradle of both package halves with the beam of the beam-type wiper blade received in the beam seat of both package halves when closed.

20. A wiper blade package in combination with a beam-type wiper blade comprising:
(a) the beam-type wiper blade comprising an elongate curved beam, an elongate wiping element that includes a spine attached to the beam and a working segment with a wiping tip extending outwardly therefrom;
(b) the wiper blade package comprising (1) a pair of elongate reclosable package halves with each one of the package halves comprising an elongate blade cradle formed therein in which part of the beam-type wiper blade is received, and a beam seat formed therein in which the beam of the beam-type wiper blade is received, (2) an elongate spine comprising a first hinge attaching the spine to one of the package halves and a second hinge attaching the spine to the other one of the package halves, (3) wherein one of the package halves is closeable over the other one of the package halves with a portion of the beam-type wiper blade disposed in the blade cradle of both package halves and with the beam of the beam-type wiper blade received in the beam seat of both package halves when closed, and (4) wherein the first hinge and the second hinge form a C-shaped stiffening rib when the package halves are closed.

21. A wiper blade package in combination with a beam-type wiper blade comprising:
(a) the beam-type wiper blade comprising an elongate curved beam, an elongate wiping element that includes a spine attached to the beam and a working segment with a wiping tip extending outwardly therefrom;
(b) the wiper blade package comprising (1) a pair of elongate reclosable package halves with at least one of the package halves comprising at least one beam seat formed therein in which the beam of the beam-type wiper blade is received and retained in a straightened condition, a blade cradle formed therein against which a portion of the wiping element of the beam-type wiper blade bears when the beam of the beam-type wiper blade is received in the beam seat, and a latching arrangement, and, (2) a hinge arrangement interconnecting the package halves, and (3) wherein one of the package halves is closeable over the other one of the package halves clamping against the sides of the wiping element of the beam-type wiper with the wiping tip protected by the package halves and hinge arrangement and not in contact with any part of the wiper blade package.

* * * * *